United States Patent
Asao

[19]

[11] Patent Number: 6,034,464
[45] Date of Patent: Mar. 7, 2000

[54] VEHICLE ALTERNATOR

[75] Inventor: Yoshihito Asao, Tokyo, Japan

[73] Assignee: Mitsubishi Denki Kabushiki Kaisha, Tokyo, Japan

[21] Appl. No.: 09/209,444

[22] Filed: Dec. 11, 1998

[30] Foreign Application Priority Data

Jul. 9, 1998 [JP] Japan ................................ 10-194336

[51] Int. Cl.$^7$ ............................................... H02K 1/22
[52] U.S. Cl. ........................... 310/263; 310/257; 310/154; 310/254; 310/43; 310/49 A
[58] Field of Search ..................... 310/263, 257, 310/154, 254, 49 A, 43

[56] References Cited

U.S. PATENT DOCUMENTS

| | | | |
|---|---|---|---|
| 5,270,605 | 12/1993 | Lefrancois et al. .................... | 310/263 |
| 5,329,199 | 7/1994 | Yockey et al. .......................... | 310/263 |
| 5,536,987 | 7/1996 | Hayashi et al. ........................ | 310/263 |
| 5,539,265 | 7/1996 | Harris et al. ............................ | 310/263 |
| 5,543,676 | 8/1996 | York et al. .............................. | 310/263 |
| 5,708,318 | 1/1998 | Fudono .................................. | 310/263 |
| 5,793,144 | 8/1998 | Kusase et al. .......................... | 310/263 |
| 5,828,155 | 10/1998 | Adachi et al. ......................... | 310/263 |

FOREIGN PATENT DOCUMENTS 4-255451   9/1992   Japan .

*Primary Examiner*—Nestor Ramirez
*Assistant Examiner*—Thanh Lam
*Attorney, Agent, or Firm*—Sughrue, Mion, Zinn, Macpeak & Seas, PLLC

[57] ABSTRACT

A vehicle alternator is constructed such that satisfies the relationship $$0.3 \leq \{Br \cdot (t1+t2) \cdot L\}/(W \cdot t1 \cdot \cos\theta) \leq 2.0$$

where Br represents the residual magnetic flux density of each of the magnets, L represents the length from the short side at the tip to the long side at the base of each of the claw-shaped magnetic poles, W represents the width in the circumferential direction at the base, $2\theta$ represents the angle formed by an oblique side which joins one end of the tip to one end of the base and another oblique side which joins the other end of the tip to the other end of the base, t1 represents the thickness of each of the claw-shaped magnetic poles at the base, and t2 represents the thickness of each of the claw-shaped magnetic poles at the tip.

7 Claims, 8 Drawing Sheets

VEHICLE ALTERNATOR

BACKGROUND OF THE INVENTION

1. Field of the Invention

The present invention relates to a vehicle alternator which comprises magnets which are disposed between adjacent claw-shaped magnetic poles to minimize magnetic flux leakage between the claw-shaped magnetic poles.

2. Description of the Related Art

FIG. 11 is a perspective view of a claw-shaped magnetic pole from the rotor of the vehicle alternator described in Japanese Patent Laid Open No. HEI 4-255451. The claw-shaped magnetic pole 50, which faces the stator, has an approximately trapezoidal shape, which comprises a short side at the tip, a long side at the base, and two oblique sides, and magnets (not shown), which are each polarized in a direction which minimizes magnetic flux leakage between adjacent claw-shaped magnetic poles 50, are interposed between the side faces 50a of the claw-shaped magnetic poles 50. These claw-shaped magnetic poles 50 are constructed such that they satisfy the formula described below in order to prevent overcharging of a battery and to provide a vehicle alternator with high efficiency and high output:

$$0.2 \leq Br(L/W \cdot \cos\theta) \leq 0.8$$

where Br is the residual magnetic flux density of each of the magnets (in tesla), L is the length of each of the claw-shaped magnetic poles 50 from the short side at the tip to the long side at the base, W is the width of the long side at the base of each of the claw-shaped magnetic poles 50, and $2\theta$ is the angle formed by the two oblique sides.

Although the vehicle alternator of the above construction can prevent overcharging of the battery and provide a vehicle alternator with high efficiency and high output, the side faces 50a of the claw-shaped magnetic poles 50 are of a prescribed thickness t from the tip to the base, and the following problems arise:

(a) The magnetic flux generated in the rotor coil flows out to the stator through gaps while moving from the base to the tip of the claw-shaped magnetic poles 50. The claw-shaped magnetic poles 50 should therefore ideally be tapered and gradually become thinner towards the tip, but the thickness of the tip and the base of the claw-shaped magnetic poles 50 is the same, and the weight at the tip is therefore that much greater and the claw-shaped magnetic poles 50 are easily displaced outwards by centrifugal force; or (b) Generally, the claw-shaped magnetic poles are thin gradually towards the tip to account for the flow of the magnetic flux, but claw-shaped magnetic poles 50 of prescribed thickness from the base to the tip must be custom manufactured and production costs mount.

SUMMARY OF THE INVENTION

The present invention aims to solve the above problems and an object of the present invention is to provide a vehicle alternator which can prevent overcharging of a battery and provide an output voltage with high efficiency and high output even if the claw-shaped magnetic poles thin gradually from the base towards the tip.

To this end, according to the present invention, there is provided a vehicle alternator comprising a rotor which includes: a rotor coil, which generates magnetic flux when an electric current is passed through it; a first pole core assembly and a second pole core assembly, each having claw-shaped magnetic poles, which are disposed so as to cover the rotor coil, are mutually interlocked, and are polarized by the magnetic flux; magnets, which are disposed between adjacent pairs of the claw-shaped magnetic poles and are polarized so as to minimize magnetic flux leakage between the claw-shaped magnetic poles;

constructed such that it satisfies the relationship $$0.3 \leq \{Br \cdot (t1+t2) \cdot L\}/(W \cdot t1 \cdot \cos\theta) \leq 2.0$$

where Br represents the residual magnetic flux density of each of the magnets, L represents the length from the short side at the tip to the long side at the base of each of the claw-shaped magnetic poles, W represents the width in the circumferential direction at the base, $2\theta$ represents the angle formed by an oblique side which joins one end of the tip to one end of the base and another oblique side which joins the other end of the tip to the other end of the base, t1 represents the thickness of each of the claw-shaped magnetic poles at the base, and t2 represents the thickness of each of the claw-shaped magnetic poles at the tip.

DETAILED DESCRIPTION OF THE PREFERRED EMBODIMENTS

Embodiment 1

Figure 1:
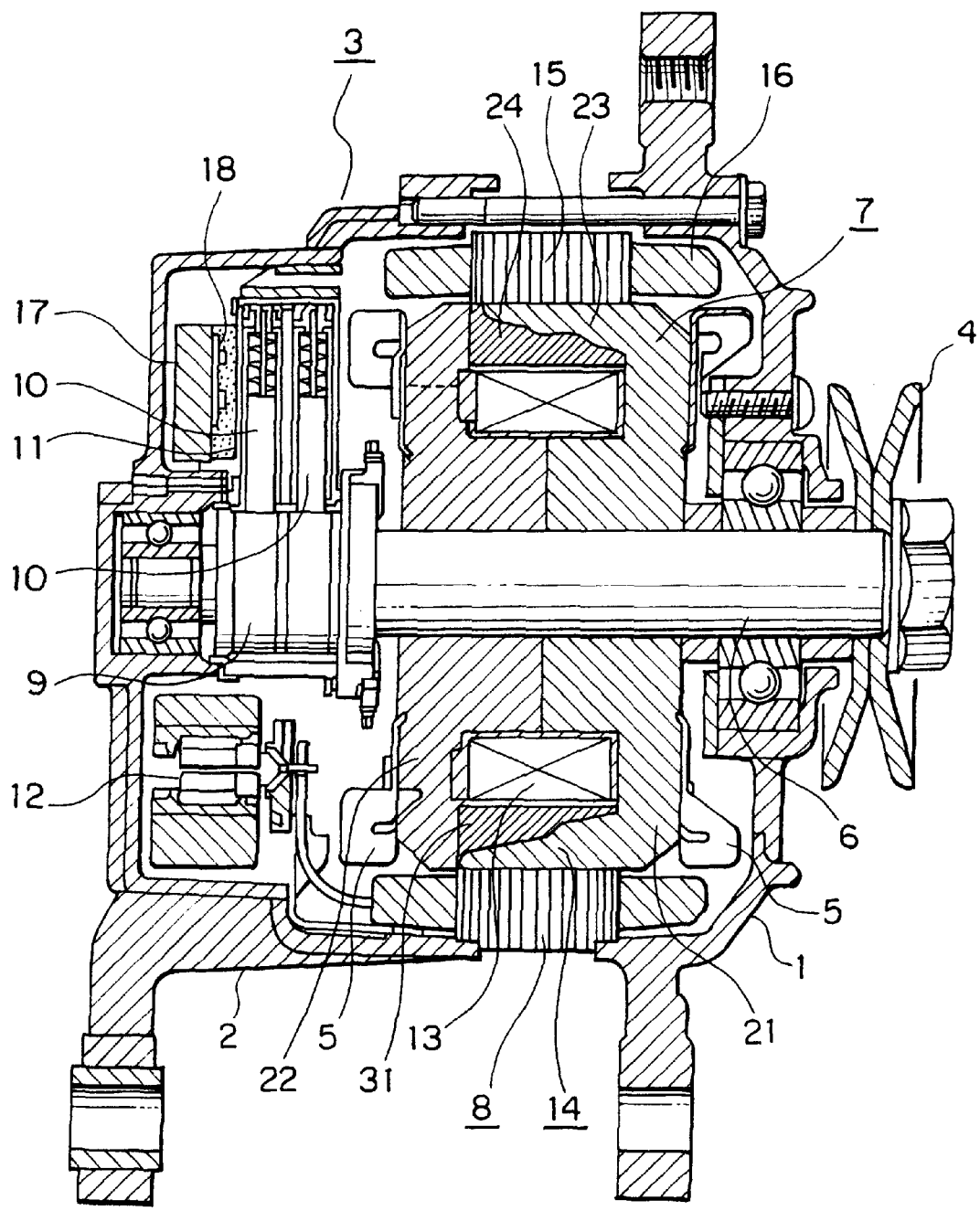
FIG. 1 is cross-section of a side elevation of the vehicle alternator according to Embodiment 1 of the present invention.
Figure 2:
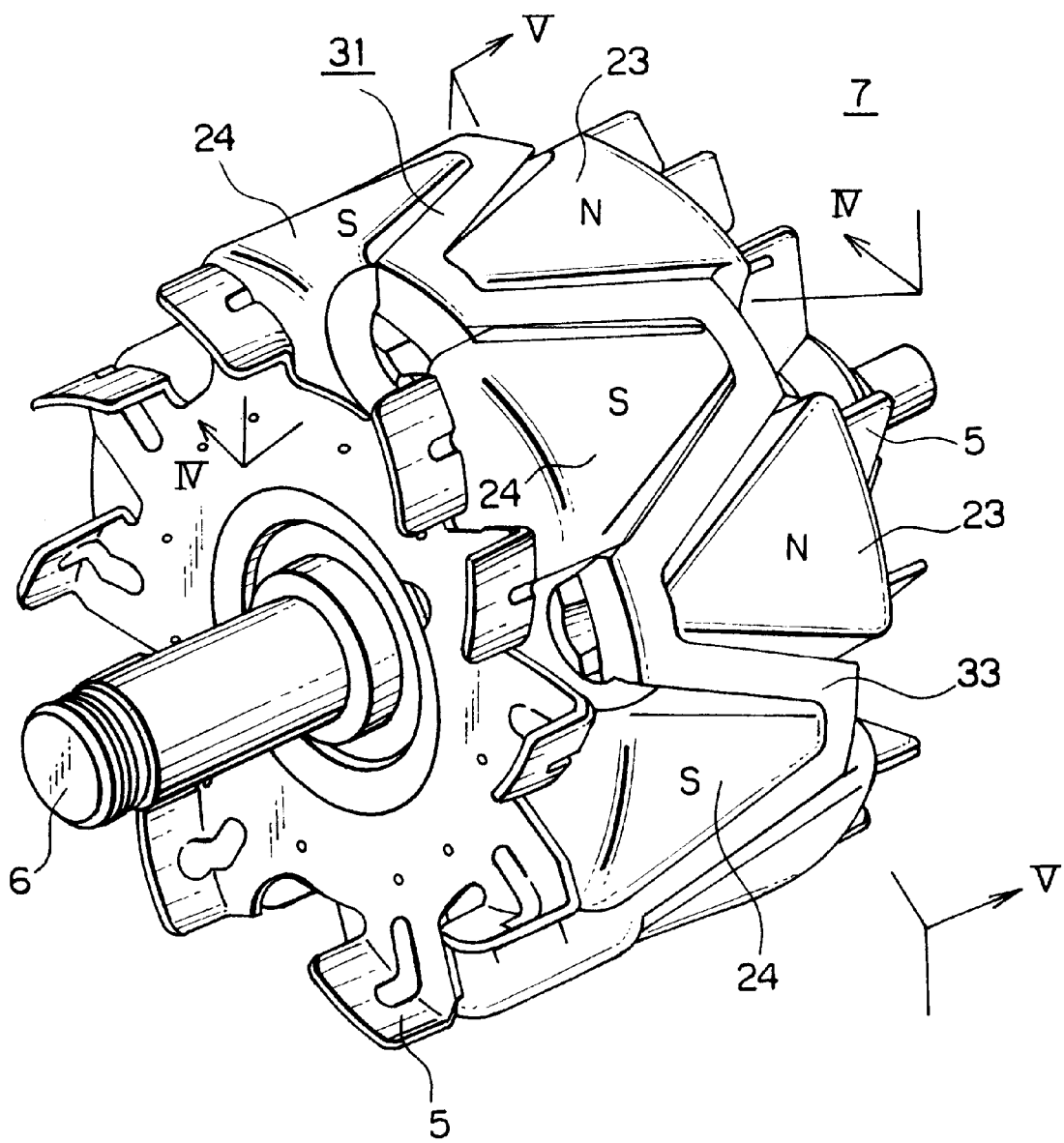
FIG. 2 is a perspective view of the rotor in FIG. 1.
Figure 3:
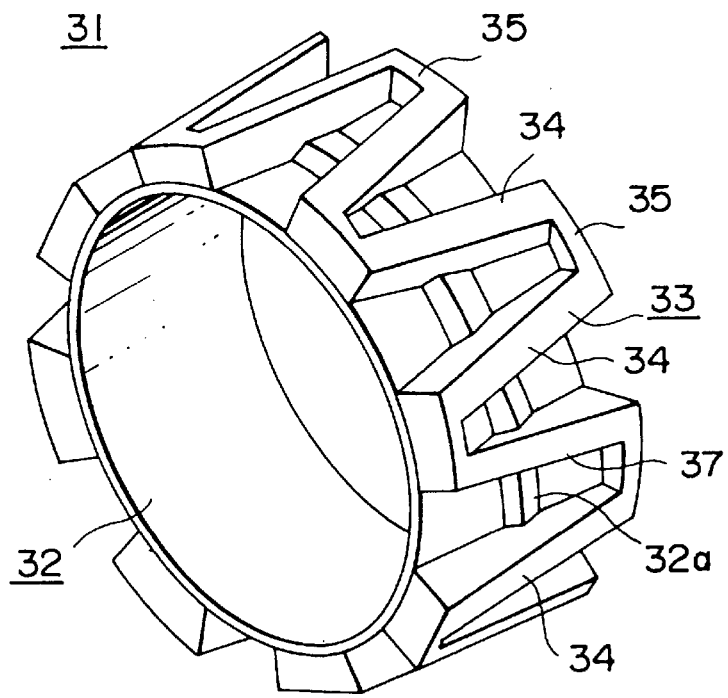
FIG. 3 is a perspective view of the magnetic assembly in FIG. 1.
Figure 4:
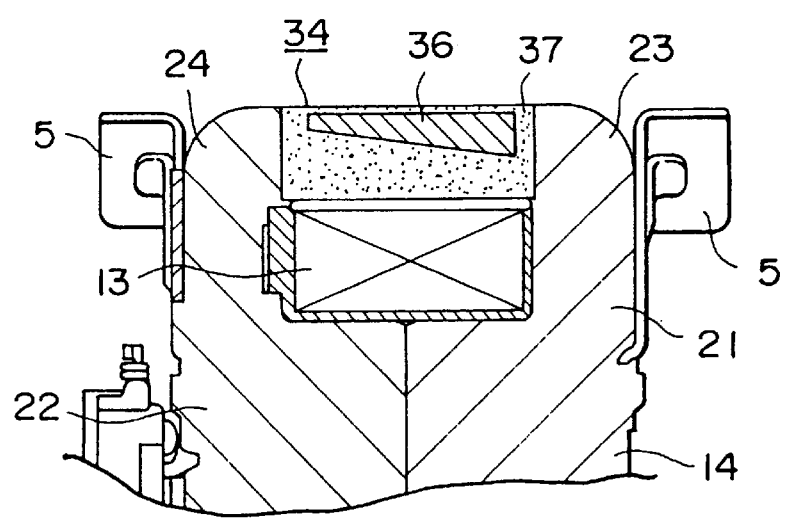
FIG. 4 is a partial cross-section along line IV—IV in FIG. 2.
Figure 5:
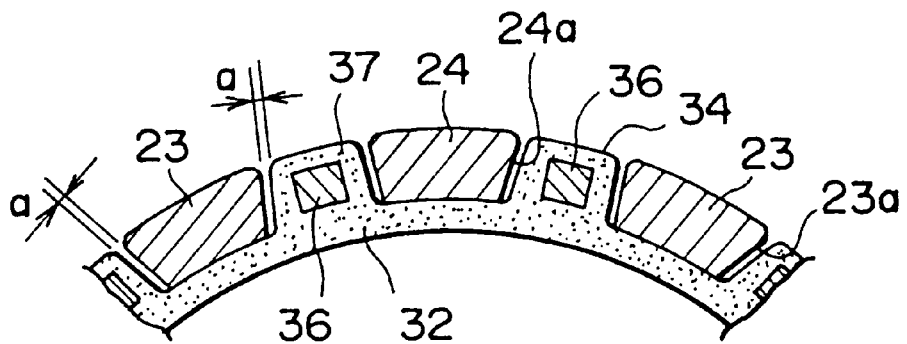
FIG. 5 is a partial cross-section along line V—V in FIG. 2.
Figure 6:
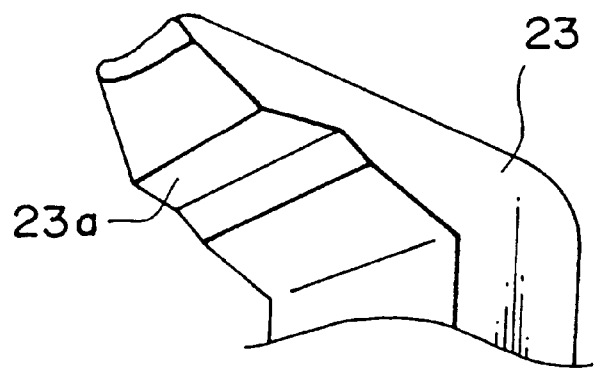
FIG. 6 is a partial perspective view of a claw-shaped magnetic pole from FIG. 1.
Figure 7:
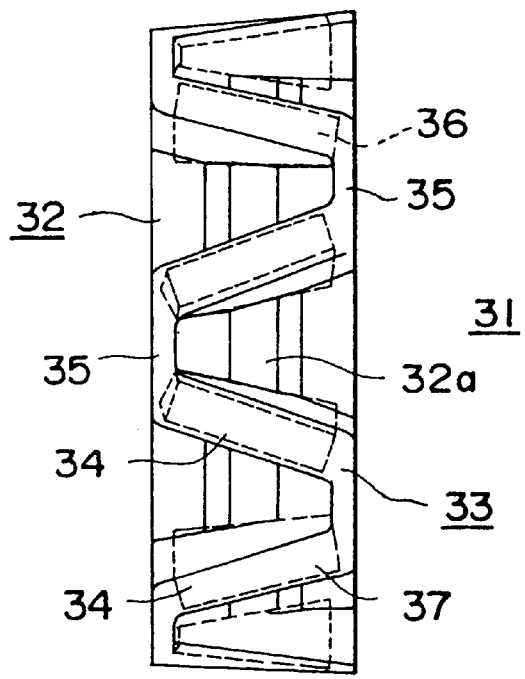
FIG. 7 is a front elevation of the magnetic assembly in FIG. 2.
Figure 8:
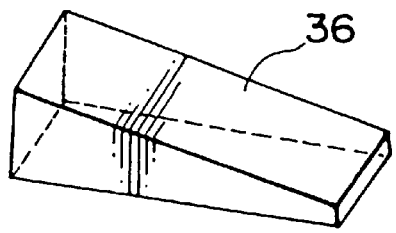
FIG. 8 is a perspective view of a magnet embedded in the magnetic assembly in FIG. 2.

FIG. 1 is cross-section of a side elevation of the vehicle alternator according to the present invention, FIG. 2 is a perspective view of the rotor in FIG. 1, FIG. 3 is a perspective view of the magnetic assembly in FIG. 1, FIG. 4 is a partial cross-section along line IV—IV in FIG. 2, FIG. 5 is a partial cross-section along line V—V in FIG. 2, FIG. 6 is a partial perspective view of a claw-shaped magnetic pole from FIG. 1, FIG. 7 is a front elevation of the magnetic assembly in FIG. 2, and FIG. 8 is a perspective view of a magnet embedded in the magnetic assembly in FIG. 2.

This vehicle alternator comprises: a case 3, which comprises an aluminum front bracket 1 and rear bracket 2; a shaft 6, which is disposed in the case 3 and to one end of which a pulley 4 is secured; a roundel-shaped rotor 7, which is secured to the shaft 6; fans 5, which are secured to both sides of this rotor 7; a stator 8, which is secured to the inner wall of the case 3; slip rings 9, which are secured to the other end of the shaft 6 and supply electric current to the rotor 7; a pair of brushes 10, which move in contact with the slip rings 9; brush holders 11, which accommodate the brushes 10; a commutator 12 in electrical contact with the stator 8, which converts an alternating current generated in the stator 8 to a direct current; a heat sink 17, which is fitted into the brush holder 11; and a regulator 18, which is secured in contact with the heat sink 17 to regulate the magnitude of the alternating voltage generated in the stator 8.

The rotor 7 in FIG. 2 comprises: a rotor coil 13, which generates a magnetic flux when an electric current is passed through it; a pole core 14, which is disposed so as to cover the rotor coil 13 and in which magnetic poles are produced by the magnetic flux generated by the rotor coil 13; and a magnetic assembly 31, which covers the rotor coil 13.

The pole core 14 comprises a first pole core assembly 21 and a second pole core assembly 22, which are mutually interlocked. The first pole core assembly 21 and the second pole core assembly 22 are made of iron, and have claw-shaped magnetic poles 23, 24, respectively.

The magnetic assembly 31 is provided with: a radially-displaceable, elastic, cylindrical support portion 32, which has step portions 32a which come into contact with step portions 23b formed on the underside of the claw-shaped magnetic poles 23; and a magnetic portion 33, which is formed in a zigzag on the support portion 32. The magnetic portion 33 is provided with: prismatic mediating portions 34, which are disposed between the sides 23a, 24a of adjacent claw-shaped magnetic poles 23, 24; and connecting portions 35, which connect the mediating portions to each other. Each of the mediating portions 34 comprises: a magnet 36, as shown in FIG. 8; and a cover portion 37, which covers the magnet 36. Each of the magnets 36 in the cover portions 37 is disposed such that the north-seeking (N) face of the magnet 36 faces the claw-shaped magnetic pole 23 which is polarized with a north-seeking (N) pole, and the south-seeking (S) face of the magnet 36 faces the claw-shaped magnetic pole 24 which is polarized with a south-seeking (S) pole. Spaces a are formed between each of the mediating portions 34 and the adjacent claw-shaped magnetic poles 23, 24.

The support portion 32 and magnetic portion 33 of the magnetic assembly 31 are formed integrally by insertion molding, in which magnets 36 are arranged in a metal mold and polyamide resin is injected into the metal mold.

The stator 8 comprises: a stator core 15; and a stator coil 16, which is a conductor wound around the stator core 15 in which an alternating current is generated in response to changes in the magnetic flux generated in the rotor coil 13 as a result of the rotation of the rotor 7.

The rotor 7 for a vehicle alternator of the above construction can be assembled with the rotor coil 13 already encased in the support portion 32 by pressing the claw-shaped magnetic poles 23, 24 together from either side of the magnetic assembly 31 so as to sandwich the zigzagged magnetic portion 33. Spaces a are formed between the sides 23a, 24a of the claw-shaped magnetic poles 23, 24 and the mediating portions 34, so that damage to the magnets 36, such as that caused by the claw-shaped magnetic poles 23, 24 impacting the mediating portions 34 when they are pressed together, is prevented.

In a vehicle alternator of the above construction, a current is supplied by a battery (not shown) through the brushes 10 and slip rings 9 to the rotor coil 13, and a magnetic flux is generated, whereby the claw-shaped magnetic poles 23 of the first pole core assembly 21 are polarized with a north-seeking (N) pole, and the claw-shaped magnetic poles 24 of the second pole core assembly 22 are polarized with a south-seeking (S) pole. At the same time, the pulley 4 is driven by the engine and the rotor 7 is rotated by the shaft 6, so that a rotating magnetic field is imparted to the stator coil 16 and electromotive force is generated in the stator coil 16. This alternating electromotive force is converted to a direct current by means of the commutator 12, its magnitude is regulated by the regulator 18, and the battery is recharged.

As the rotor 7 rotates, centrifugal force acts on the magnets 36 as well as the claw-shaped magnetic poles 23, 24, but the magnets are supported against this load especially by the cylindrical support portion 32 and the magnets 36 are not subjected to a load, so that the magnets 36 are not damaged or otherwise affected by the centrifugal force.

Also, the support portion 32 of the magnetic assembly 31 is minutely displaced in a radially inward direction as a result of the support portion 32 of the magnetic assembly 31 being pushed inwards by the claw-shaped magnetic poles 23, 24 at the time of assembly of the rotor 7, but any residual stress occurring in the support portion 32 of the magnetic assembly 31 at the time of assembly is reduced as a result of the displacement of the support portion 32 in a radially outward direction by centrifugal force when the rotor 7 is rotating.

Figure 9:
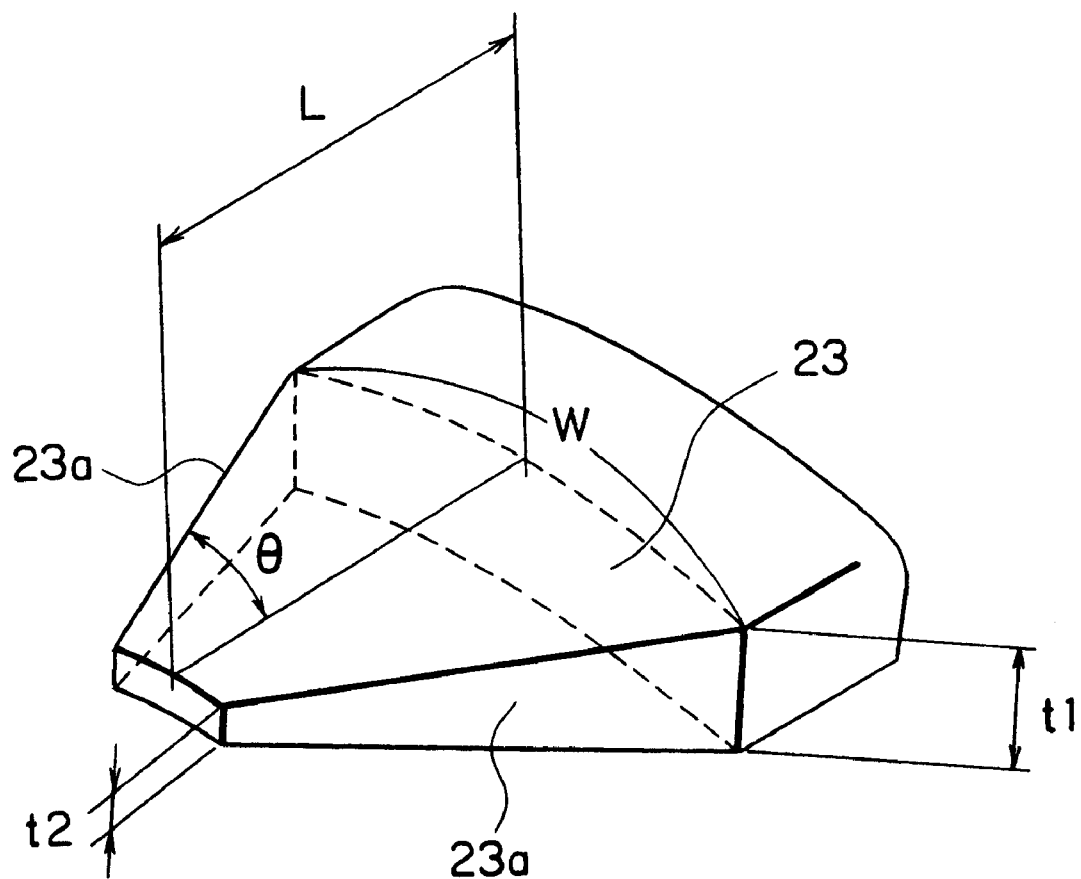
FIG. 9 is a perspective view of a claw-shaped magnetic pole from FIG. 1.

FIG. 9 is a perspective view of a claw-shaped magnetic pole 23, and this claw-shaped magnetic pole 23 is constructed such that it satisfies the following formula:

$$0.3 \leq \{Br \cdot (t1+t2) \cdot L\}/(W \cdot t1 \cdot \cos\theta) \leq 2.0$$

where Br is the residual magnetic flux density of each of the magnets 36 (in tesla), L is the length from the short side at the tip to the long side at the base of each of the claw-shaped magnetic poles 23, W is the width in the circumferential direction at the base, $2\theta$ is the angle formed by the two oblique sides, t1 is the thickness of each of the claw-shaped magnetic poles 23 at the base, and t2 is the thickness of each of the claw-shaped magnetic poles 23 at the tip.

Next, the basis for the above formula will be explained.

In the claw-shaped magnetic poles 23, magnetic flux flows to the stator 8 radially outside through gaps while moving from the base to the tip of the claw-shaped magnetic poles 23. At this time, some of the flux leaks towards the sides 24a of the claw-shaped magnetic poles 24 which are circumferentially adjacent. This flux does not contribute to the generation of power by the vehicle alternator. In order to prevent the leakage of flux which does not contribute to the generation of power, magnets 36 are disposed between the claw-shaped magnetic poles 23 and the claw-shaped magnetic poles 24, and the north-seeking (N) faces of the magnets 36 face the claw-shaped magnetic poles 23 which are polarized with north-seeking (N) poles, and the south-seeking (S) faces of the magnets 36 face the claw-shaped magnetic poles 24 which are polarized with south-seeking (S) poles.

When no current is being passed through the rotor coil 13, provided that the flux resulting from the magnets 36 alone does not saturate the cross-section of the base of each of the claw-shaped magnetic poles 23 (W×t1), very little flux flows to the stator 8, and the voltage generated at zero-excitation (the output voltage of the alternator from the magnets alone when the rotor coil 13 is in a zero-excitation state) is low. However, when the cross-section of the base of each of the claw-shaped magnetic poles 23 is saturated, the amount of flux flowing to the stator 8 can be expected to increase dramatically and consequently the voltage generated at zero-excitation will rise at an accelerated rate.

Now, when the rotor coil 13 is in a zero-excitation state, the flux from the magnets 36 between the claw-shaped magnetic poles 23, 24 passes through the cross-section of the base of each of the claw-shaped magnetic poles 23 (W×t1) heading towards the tip, and if the flux is assumed to have all flowed to the left and right sides 23a of each of the claw-shaped magnetic poles 23, the following formula (1) is satisfied:

$$Bi \cdot W \cdot t1 = 2Br \cdot S1 \tag{1}$$

where Bi is the magnetic flux density in the cross-section of the base of each of the claw-shaped magnetic poles 23, Br is the residual magnetic flux density in each of the magnets 36, and S1 is the surface area of the sides 23a of each of the claw-shaped magnetic poles 23.

The surface area S1 is given by a formula (2), and by substituting the formula for S1 into the formula (1), a formula (3) for determining the magnetic flux density Bi in the cross-section of the base of each of the claw-shaped magnetic poles 23 results, and let this be X.

$$S1 = \{(t1+t2)/2\} \times (L/\cos\theta) \tag{2}$$

$$Bi = \{Br \cdot (t1+t2) \cdot L\}/(W \cdot t1 \cdot \cos\theta) = X \tag{3}$$

Figure 10:
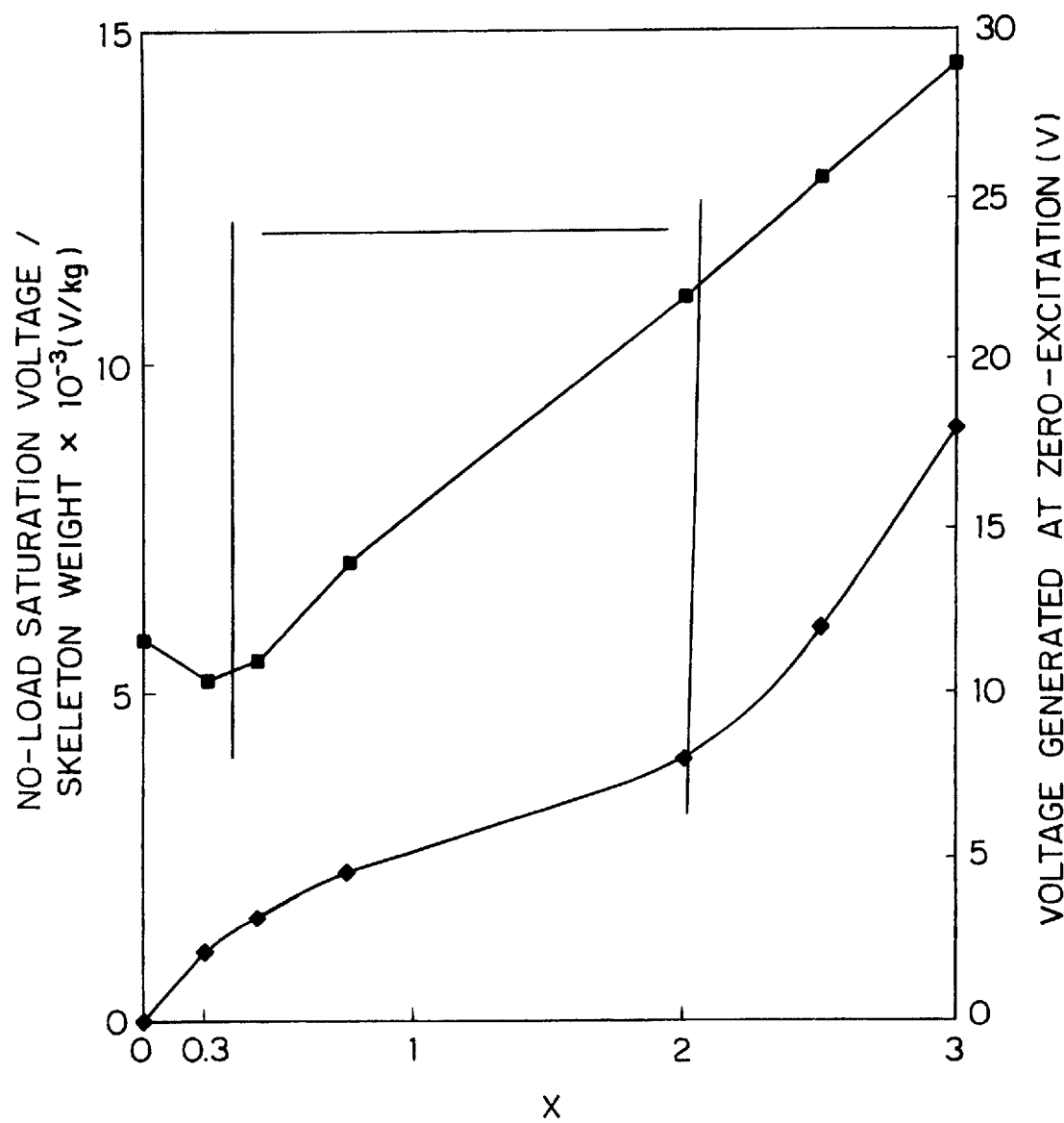
FIG. 10 is a graph showing the relationship between X and the voltage generated at zero-excitation, and the relationship between X and no-load saturation voltage per unit skeleton weight.
Figure 11:
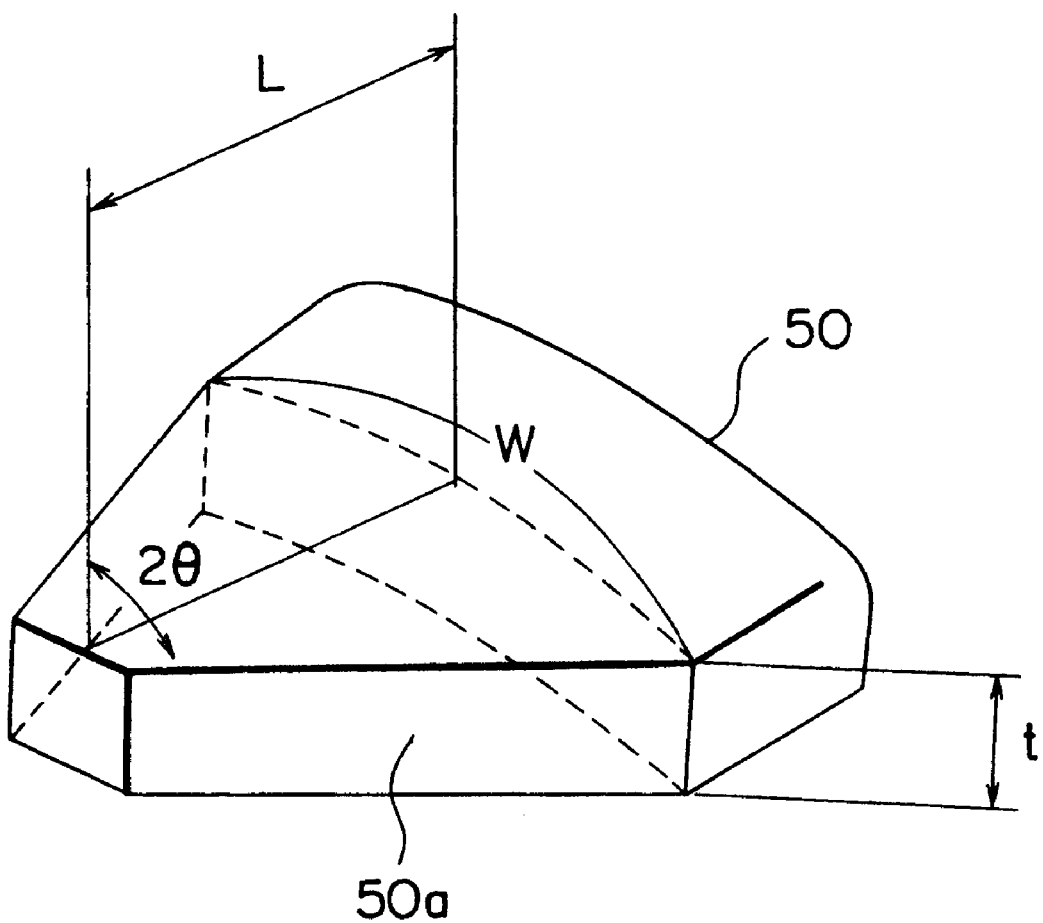
FIG. 11 is a perspective view of a claw-shaped magnetic pole from a conventional rotor.

FIG. 10 is a graph of the voltage generated at zero-excitation measured against X with the rotor 7 at 5000 rpm. As can be seen from the graph, a point of inflection was discovered in the vicinity of X=2.0 T, and above this point the voltage generated at zero-excitation increases at an accelerated rate.

On examining the distribution of magnetic flux density in the claw-shaped magnetic poles 23, the experiment shows that the magnetic flux density in the tips of the claw-shaped magnetic poles 23 was higher than in any other part and that the magnetic flux density had reached saturation, and the value of X=2.0 T at the point of inflection, that is, Bi=2.0, agrees approximately with the magnetic flux saturation density for iron which is the material the claw-shaped magnetic poles 23 are made of. Thus, the measured data show that effective flux does not flow onto the stator side until the cross-section of the tips of the claw-shaped magnetic poles 23 has been saturated, and when the magnetic flux density in the cross-section of the tips exceeds the saturation density, effective flux flows onto the stator side and increases dramatically, and as result the voltage generated at zero-excitation increases at an accelerated rate.

The measured data described above were taken with the rotor 7 at 5000 rpm, but even if the number of revolutions per minute is changed, the value of the voltage generated at zero-excitation will simply change proportionally thereto and the position of the point of inflection will remain approximately the same.

Thus, if the claw-shaped magnetic poles 23 are designed such that the magnetic flux density in the cross-section of the tips of the claw-shaped magnetic poles 23 is 2.0 T or less, the value of the voltage generated at zero-excitation can be kept within an acceptable range, and overcharging of the battery can be prevented.

Now, interposing magnets between the claw-shaped magnetic poles 23, 24, minimizes magnetic flux leakage and improves the output efficiency of the alternator, but the resulting increase in the weight of the rotor 7 is undesirable.

FIG. 10 shows the values of no-load saturation voltage per unit skeleton weight measured against X with the rotor 7 at 1000 rpm. Here, no-load saturation voltage represents the output voltage of the alternator when there is no current flowing through the stator coil 16, and skeleton weight is the weight of the parts forming the electromagnetic circuit in the alternator, which is mainly the weight of the stator core 15 and the pole core assembly 14 in the rotor 7.

As can be seen from the graph, although the magnetic flux leakage described above is minimized by the increased magnetic flux accompanying the increased weight of the magnets, the output voltage of the alternator per unit weight decreases up to X=0.3 T. When the value of X exceeds 0.3 T, the minimization of the magnetic flux leakage due to the increased magnetic flux accompanying the increased weight of the magnets starts to take effect, and the output voltage of the alternator per unit weight increases proportionally.

The measured data described above were taken with the rotor 7 at 1000 rpm, but even if the number of revolutions per minute is changed, X will still show a minimum value for the output voltage of the alternator per unit weight in the vicinity of 0.3 T.

For example, if 180 g neodymium-iron plastic magnets with Br=0.39 T, are used with claw-shaped magnetic poles of t1=10.4 cm, t2=2.5 cm W=L=27 cm and θ=21 degrees, the amount of effective flux (the amount of flux which flows to the stator) improves by approximately 13 percent and the no-load saturation voltage per unit skeleton weight improves by 6 percent compared to when X=0.53 and no magnets are used. When X=0.33, the no-load saturation voltage per unit skeleton weight is $5.5 \times 10^{-3}$ V/kg, which is roughly equivalent to when no magnets are used.

As explained above, in the vehicle alternator according to the present invention, the claw-shaped magnetic poles satisfy the relationship $$0.3 \leq \{Br \cdot (t1+t2) \cdot L\}/(W \cdot t1 \cdot \cos\theta) \leq 2.0$$

where Br represents the residual magnetic flux density of each of the magnets, L represents the length from the short side at the tip to the long side at the base of each of the claw-shaped magnetic poles, W represents the width in the circumferential direction at the base, 2θ represents the angle formed by an oblique side which joins one end of the tip to one end of the base and another oblique side which joins the other end of the tip to the other end of the base, t1 represents the thickness of each of the claw-shaped magnetic poles at the base, and t2 represents the thickness of each of the claw-shaped magnetic poles at the tip. Therefore, the vehicle alternator can provide a vehicle alternator with high efficiency which can prevent overcharging of the battery even if the claw-shaped magnetic poles thin gradually from the base towards the tip.

The magnetic assembly comprising prismatic mediating portions, each comprising a magnet and a cover portion made of resin which covers the magnet, may be formed in a zigzag so as to be disposed between each of the adjacent claw-shaped magnetic poles. Therefore, the entire magnetic assembly supports the magnets against the load of centrifugal force and damage to the magnets due to centrifugal force is prevented.

Spaces may be formed between the mediating portions and the claw-shaped magnetic poles. Therefore, the vehicle alternator prevents the claw-shaped magnetic poles from impacting and damaging the mediating portions while the claw-shaped magnetic poles are being fitted from both sides of the magnetic assembly. Also, the dimensional precision of the claw-shaped magnetic poles in the circumferential direction does not have to be high, so that the claw-shaped magnetic poles can be formed more easily.

The magnetic assembly may have cylindrical support portion disposed inward from the claw-shaped magnetic poles which supports the magnets. Therefore, the vehicle alternator significantly strengthens the magnetic assembly against centrifugal force.

The support portion may be elastic. Therefore, the vehicle alternator absorbs manufacturing errors which occur between the dimensions of the magnetic assembly and claw-shaped magnetic poles and enables the claw-shaped magnetic poles to be fitted from both sides of the magnetic assembly.

The mediating portions and the support portion may be formed integrally by insertion molding. Therefore, the vehicle alternator enables the mediating portions and the support portion to be easily integrated.

The support portion and the cover portions of the mediating portions may be composed of a polyamide resin. Therefore, the vehicle alternator enables a support portion and cover portions with superior elasticity and insulation to be obtained at low cost.

What is claimed is:

1. A vehicle alternator comprising a rotor which includes:
   a rotor coil, which generates magnetic flux when an electric current is passed through it;
   a first pole core assembly and a second pole core assembly, each having claw-shaped magnetic poles, which are disposed so as to cover said rotor coil, are mutually interlocked, and are polarized by said magnetic flux;
   magnets, which are disposed between adjacent pairs of said claw-shaped magnetic poles and are polarized so as to minimize magnetic flux leakage between said claw-shaped magnetic poles;
   said claw shaped magnetic poles constructed such that it satisfies the relationship $$0.3 \leq \{Br \cdot (t1+t2) \cdot L\}/(W \cdot t1 \cdot \cos\theta) \leq 2.0$$

where Br represents the residual magnetic flux density of each of said magnets, L represents the length from the short side at the tip to the long side at the base of each of said claw-shaped magnetic poles, W represents the width in the circumferential direction at said base, $2\theta$ represents the angle formed by an oblique side which joins one end of said tip to one end of said base and another oblique side which joins the other end of said tip to the other end of said base, t1 represents the thickness of each of said claw-shaped magnetic poles at the base, and t2 represents the thickness of each of said claw-shaped magnetic poles at the tip.

2. The vehicle alternator according to claim 1, wherein a magnetic assembly comprising prismatic mediating portions, each comprising a magnet and a cover portion made of resin which covers said magnet, is formed in a zigzag so as to be disposed between each of said adjacent claw-shaped magnetic poles.

3. The vehicle alternator according to claim 2, wherein spaces are formed between said mediating portions and said claw-shaped magnetic poles.

4. The vehicle alternator according to claims 2, wherein said magnetic assembly has a cylindrical support portion disposed inward from said claw-shaped magnetic poles which supports said magnets.

5. The vehicle alternator according to claim 4, wherein said support portion is elastic.

6. The vehicle alternator according to claim 4, wherein said mediating portions and said support portion are formed integrally by insertion molding.

7. The vehicle alternator according to claim 6, wherein said support portion and said cover portions of said mediating portions are composed of a polyamide resin.

* * * * *